US009983793B2

(12) United States Patent
Liu et al.

(10) Patent No.: US 9,983,793 B2
(45) Date of Patent: May 29, 2018

(54) MEMORY RESOURCE OPTIMIZATION METHOD AND APPARATUS

(71) Applicant: HUAWEI TECHNOLOGIES CO., LTD., Shenzhen, Guangdong (CN)

(72) Inventors: Lei Liu, Beijing (CN); Chengyong Wu, Beijing (CN); Xiaobing Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/712,296

(22) Filed: Sep. 22, 2017

(65) Prior Publication Data

US 2018/0011638 A1 Jan. 11, 2018

Related U.S. Application Data

(63) Continuation of application No. 15/135,822, filed on Apr. 22, 2016, now Pat. No. 9,857,980, which is a (Continued)

(30) Foreign Application Priority Data

Oct. 23, 2013 (CN) .......................... 2013 1 0503238

(51) Int. Cl.
*G06F 3/06* (2006.01)
*G06F 11/34* (2006.01)
(Continued)

(52) U.S. Cl.
CPC .......... *G06F 3/0605* (2013.01); *G06F 3/0631* (2013.01); *G06F 3/0644* (2013.01);
(Continued)

(58) Field of Classification Search
CPC .... G06F 3/0605; G06F 3/0631; G06F 3/0644; G06F 3/0653; G06F 3/0679;
(Continued)

(56) References Cited

U.S. PATENT DOCUMENTS 7,434,002 B1 10/2008 Zedlewski et al.
7,512,768 B2 3/2009 Gutti et al.
(Continued)

FOREIGN PATENT DOCUMENTS

CN 101719105 A 6/2010
CN 101916230 A 12/2010
(Continued)

OTHER PUBLICATIONS

Lei Liu et al. A software memory partition approach for eliminating bank-level interference in multicore systems. In PACT. 2012. total 9 pages.
(Continued)

*Primary Examiner* — Stephen Elmore
(74) *Attorney, Agent, or Firm* — Huawei Technologies Co., Ltd.

(57) ABSTRACT

Embodiments of the present invention provide a memory resource optimization method and apparatus, relate to the computer field, solve a problem that existing multi-level memory resources affect each other, and optimize an existing single partitioning mechanism. A specific solution is: obtaining performance data of each program in a working set by using a page coloring technology, obtaining a category of each program in light of a memory access frequency, selecting, according to the category of each program, a page coloring-based partitioning policy corresponding to the working set, and writing the page coloring-based partitioning policy to an operating system kernel, to complete corresponding page coloring-based par-
(Continued)

titioning processing. The present invention is used to eliminate or reduce mutual interference of processes or threads on a memory resource in light of a feature of the working set, thereby improving overall performance of a computer.

21 Claims, 4 Drawing Sheets

Related U.S. Application Data continuation of application No. PCT/CN2014/089194, filed on Oct. 22, 2014.

(51) Int. Cl.
    *G06F 9/50*     (2006.01)
    *G06F 12/0811*     (2016.01)
    *G06F 12/0842*     (2016.01)
    *G06F 12/0897*     (2016.01)
    *G06F 12/084*     (2016.01)

(52) U.S. Cl.
    CPC .......... *G06F 3/0653* (2013.01); *G06F 3/0679* (2013.01); *G06F 9/5016* (2013.01); *G06F 11/3409* (2013.01); *G06F 11/3471* (2013.01); *G06F 12/0811* (2013.01); *G06F 12/0842* (2013.01); *G06F 12/0897* (2013.01); *G06F 12/084* (2013.01); *G06F 2201/81* (2013.01); *G06F 2212/1041* (2013.01); *G06F 2212/282* (2013.01); *G06F 2212/6042* (2013.01)

(58) Field of Classification Search
    CPC ............... G06F 9/5016; G06F 11/3409; G06F 11/3471; G06F 12/0811; G06F 12/0897
    USPC .......................... 711/105, 129, 154, 156, 173
    See application file for complete search history.

(56) References Cited

U.S. PATENT DOCUMENTS

| | | | |
|---|---|---|---|
| 7,581,064 B1 | 8/2009 | Zedlewski et al. | |
| 7,664,796 B2 * | 2/2010 | Powell | G06F 3/0605 707/812 |
| 7,747,820 B2 | 6/2010 | Beckmann et al. | |
| 7,831,773 B2 | 11/2010 | Zedlewski et al. | |
| 7,913,040 B2 | 3/2011 | Beckmann et al. | |
| 8,327,085 B2 * | 12/2012 | Anand | G06F 11/3433 711/153 |
| 8,612,711 B1 * | 12/2013 | Griffin | G06F 13/4221 710/3 |
| 8,621,649 B1 * | 12/2013 | Van Dijk | H04L 29/06 713/150 |
| 8,880,682 B2 * | 11/2014 | Bishop | G06F 11/3495 709/203 |
| 8,914,606 B2 * | 12/2014 | Culter | G06F 9/5077 711/173 |
| 8,966,171 B2 | 2/2015 | Zhang et al. | |
| 2003/0023824 A1 | 1/2003 | Wooldridge | |
| 2005/0228964 A1 | 10/2005 | Sechrest et al. | |
| 2006/0259733 A1 | 11/2006 | Yamazaki et al. | |
| 2007/0143315 A1 * | 6/2007 | Stone | G06F 9/544 |
| 2007/0157003 A1 | 7/2007 | Durham et al. | |
| 2008/0313420 A1 | 12/2008 | Beckmann et al. | |
| 2010/0283793 A1 | 11/2010 | Cameron et al. | |
| 2012/0079501 A1 | 3/2012 | Sandstrom | |
| 2013/0275649 A1 | 10/2013 | Zhang et al. | |
| 2016/0239213 A1 * | 8/2016 | Liu | G06F 9/5016 |

FOREIGN PATENT DOCUMENTS

| | | |
|---|---|---|
| CN | 102663115 A | 9/2012 |
| CN | 103077128 A | 5/2013 |
| CN | 103136120 A | 6/2013 |
| JP | 2000339220 A | 12/2000 |
| JP | 2006318477 A | 11/2006 |
| JP | 5293611 B2 | 9/2013 |
| RU | 2482535 C2 | 5/2013 |

OTHER PUBLICATIONS

Jiang Lin et al. Gaining Insights into Multicore Cache Partitioning: Bridging the Gap between Simulation and Real Systems. IEEE, 2008. total 12 pages.

Lei Liu et al. Going Vertical in Memory Management: Handling Multiplicity by Multi-policy, IEEE, ISCA'14, Jun. 14-18, 2014, total 12 pages.

\* cited by examiner

MEMORY RESOURCE OPTIMIZATION METHOD AND APPARATUS

CROSS-REFERENCE TO RELATED APPLICATIONS

This application is a continuation of U.S. patent application Ser. No. 15/135,822, filed on Apr. 22, 2016, which is a continuation of International Application No. PCT/CN2014/089194, filed on Oct. 22, 2014. The International Application claims priority to Chinese Patent Application No. 201310503238.1, filed on Oct. 23, 2013. All of the aforementioned patent applications are hereby incorporated by reference in their entireties.

TECHNICAL FIELD

The present invention relates to the computer field, and in particular, to a memory resource optimization method and apparatus.

BACKGROUND

Currently, a multi-core high performance computer is applied more widely. Moreover, as a quantity of calculating units (for example, cores) on a processor continues to increase, a memory access contention phenomenon among multiple cores further complicates a problem. In any time period of concurrent execution, memory access requests from different cores may contend for memory access to global memory resources, further triggering a conflict over resources such as a memory controller (MC), bandwidth, and a dynamic random access memory bank (for example, DRAM Bank); as a result, resource utilization is affected.

Access to a main memory is used as an example. Usually, a single transistor is used as a storage unit, N*M storage units form a storage matrix, and several storage matrices constitute a bank. Each Bank has a row-buffer; when data is to be accessed, data in a target row can be read only after the data is moved to the row-buffer. A modern DRAM system usually uses multiple Banks, and respective memory access requests are processed independently at the same time. However, if two memory access requests that are from different processes or threads access different rows of a same DRAM Bank, a conflict (or referred to as a row-buffer conflict) on the DRAM Bank may be generated, and a memory access delay is increased. A cache is used to alleviate a gap between a calculating unit and a main memory. Because the cache is closer to the calculating unit than the main memory, the cache affects calculation performance more easily. Existing processors basically use a structure of sharing a last level cache (LLC) among multiple cores. However, the LLC is also intensely contended for among multiple concurrent programs or threads. If no proper management policy is used, it is very easy to cause serious performance deterioration.

In the prior art, the LLC or the DRAM Bank is partitioned by using page coloring. Regarding page coloring-based LLC partitioning, a Cache resource is partitioned into several independent parts in a manner of performing page coloring on index bits of a cache set in a physical address, and the parts are assigned to different threads separately. Therefore, inter-thread contention due to sharing of a Cache disappears. Similar to the LLC partitioning, index bits of the DRAM Bank can also be reflected in a physical address, and the DRAM Bank can also be partitioned into several independent groups by performing coloring according to these address bits; therefore, inter-program contention on the DRAM Bank disappears. For some working sets, a relatively good performance improvement effect can be achieved.

However, when a conventional page coloring technology is used to partition a resource at a level, a negative impact is caused on utilization of a resource at another level. For example, work related to the LLC partitioning has a restriction on performance improvement of a DRAM Bank resource; similarly, work related to the DRAM Bank partitioning also affects performance of an LLC resource. In addition, because running of a modern computer system requires various working sets, an existing page coloring-based partitioning mechanism for a resource at a level is difficult to match up with features of different working sets; as a result, an optimum partitioning effect cannot be achieved, and overall performance improvement of the computer is limited.

SUMMARY

Embodiments of the present invention provide a memory resource optimization method and apparatus, provide a collaborative partitioning policy between an LLC and a DRAM Bank, where the policy is combined with a feature of a working set, and can solve a problem that processes or threads mutually affect each other when sharing memory resources, so that overall performance of a computer is improved.

To achieve the foregoing objectives, the following technical solutions are used in the embodiment of the present invention:

According to a first aspect, a memory resource optimization method is provided, where the method includes:

acquiring performance data of each program in a working set, and categorizing each program by comparing the performance data of each program and a memory access frequency, obtained by means of statistics collection, of each program with a preset threshold, where the performance data of each program is a variation that is generated when a preset performance indicator of each program varies with a capacity of an allocated last level cache LLC resource;

selecting, in light of categorization of each program in the working set and a preset decision policy, a page coloring-based partitioning policy corresponding to the working set, where the page coloring-based partitioning policy includes a page coloring-based collaborative partitioning policy for performing page coloring-based partitioning on both the LLC and the dynamic random access memory bank DRAM Bank; and writing the page coloring-based partitioning policy corresponding to the working set to an operating system kernel, where the operating system kernel performs corresponding page coloring-based partitioning processing.

With reference to the first aspect, in a first implementation manner, the acquiring performance data of each program in a working set includes:

partitioning the LLC resource into N portions by using a page coloring technology, taking 1/N of a maximum capacity of the LLC resource as one level, allocating the maximum capacity of the LLC resource to each program at the beginning, and decreasing the capacity of the LLC resource allocated to each program by one level in each adjustment, until the capacity is decreased to 1/N of the maximum capacity of the LLC resource; and monitoring a variation that is generated when the preset performance indicator of each program varies with the capacity of the allocated LLC resource in an adjustment process, and using the variation as the performance data of each program, where the preset performance indicator is a speed-up ratio of each program.

With reference to the first aspect or the first possible implementation manner of the first aspect, in a second possible implementation manner, the categorizing each program by comparing the performance data of each program and a memory access frequency, obtained by means of statistics collection, of each program with a preset threshold includes:

counting a quantity of times that each program accesses a main memory in a preset stage of a running process, to obtain the memory access frequency of each program;

comparing the performance data of each program and the memory access frequency, obtained by means of statistics collection, of each program with the preset threshold, where the preset threshold includes a first threshold, a second threshold, and a third threshold, the first threshold and the second threshold are performance data thresholds, and the third threshold is a memory access frequency threshold; and if performance data of a program is greater than the first threshold, categorizing the program as a high demand type;

if performance data of a program is less than the first threshold and greater than the second threshold, categorizing the program as a medium demand type; or if performance data of a program is less than the second threshold and a memory access frequency is greater than the third threshold, categorizing the program as a low demand and intensive type.

With reference to the first aspect, in a third possible implementation manner, the preset decision policy is a partitioning policy decision tree in the operating system kernel, and the partitioning policy decision tree is implemented in the operating system kernel in algorithm form; and the selecting, in light of categorization of each program in the working set and a preset decision policy, a page coloring-based partitioning policy corresponding to the working set includes:

updating the categorization of each program in the working set to the operating system kernel, and searching the partitioning policy decision tree in the operating system kernel for a corresponding node in light of a category of each program in the working set, to determine the page coloring-based partitioning policy corresponding to the working set.

With reference to the third possible implementation manner of the first aspect, in a fourth possible implementation manner, the page coloring-based partitioning policy includes the page coloring-based collaborative partitioning policy and a page coloring-based non-collaborative partitioning policy;

the page coloring-based collaborative partitioning policy is a partitioning policy of using overlapped index address bits O-bits as page coloring-based partitioning index bits, and the O-bits are overlapped address bits of index bits of the LLC and index bits of the DRAM Bank in a physical page frame, and are used to index page coloring-based partitioning for both the LLC and the DRAM Bank; and the page coloring-based collaborative partitioning policy includes:

a category A multi-level memory collaborative partitioning policy A-MMCP, in which the O-bits are used as partitioning index bits, and the LLC and the DRAM Bank are partitioned into a same quantity of equal portions;

a category B multi-level memory collaborative partitioning policy B-MMCP, in which the O-bits and an index bit of the DRAM Bank are used as partitioning index bits, the LLC and the DRAM Bank are partitioned into different quantities of equal portions, and a quantity of partitioned equal portions of the DRAM Bank is greater than a quantity of partitioned equal portions of the LLC; and a category C multi-level memory collaborative partitioning policy C-MMCP, in which the O-bits and an index bit of the LLC are used as partitioning index bits, the LLC and the DRAM Bank are partitioned into different quantities of equal portions, and a quantity of partitioned equal portions of the DRAM Bank is less than a quantity of partitioned equal portions of the LLC; and the page coloring-based non-collaborative partitioning policy is a partitioning policy in which the O-bits are not used and includes:

a Cache-Only policy, in which coloring-based partitioning is performed on the LLC by using the index bit of the LLC, and coloring-based partitioning is not performed on the DRAM Bank; and a Bank-Only policy, in which coloring-based partitioning is performed on the DRAM Bank by using the index bit of the DRAM Bank, and coloring-based partitioning is not performed on the LLC.

With reference to the third possible implementation manner of the first aspect or the fourth possible implementation manner of the first aspect, in a fifth possible implementation manner, the searching the partitioning policy decision tree in the operating system kernel for a corresponding node in light of a category of each program in the working set, to determine the page coloring-based partitioning policy corresponding to the working set includes:

if each category to which each program in the working set belongs is the high demand type, selecting the Bank-Only policy;

if there is the low demand and intensive type in a category to which each program in the working set belongs, further determining a quantity of programs in the working set; and if the quantity of programs is less than or equal to N, selecting the A-MMCP; otherwise, selecting the C-MMCP, where N is a quantity of cores of a processor; or if there is the medium demand type and there is no low demand and intensive type in a category to which each program in the working set belongs, further determining a quantity of programs in the working set; and if the quantity of programs is less than or equal to N, selecting the A-MMCP; otherwise, selecting the B-MMCP, where N is a quantity of cores of a processor.

According to a second aspect, a memory resource optimization apparatus is provided, where the apparatus includes:

a front end unit, configured to acquire performance data of each program in a working set, and categorize each program by comparing the performance data of each program and a memory access frequency, obtained by means of statistics collection, of each program with a preset threshold, where the performance data of each program is a variation that is generated when a preset performance indicator of each program varies with a capacity of an allocated last level cache LLC resource;

a decision-making unit, configured to select, in light of categorization of each program in the working set and a preset decision policy, a page coloring-based partitioning policy corresponding to the working set, where the page coloring-based partitioning policy includes a page coloring-based collaborative partitioning policy for performing page coloring-based partitioning on both the LLC and the dynamic random access memory bank DRAM Bank; and a partitioning unit, configured to write the page coloring-based partitioning policy corresponding to the working set to an operating system kernel, where the operating system kernel performs corresponding page coloring-based partitioning processing.

With reference to the second aspect, in a first implementation manner, the front end unit includes a data collecting unit, where the data collecting unit is specifically configured to:

partition the LLC resource into N portions by using a page coloring technology, take 1/N of a maximum capacity of the LLC resource as one level, allocate the maximum capacity of the LLC resource to each program at the beginning, and decrease the capacity of the LLC resource allocated to each program by one level in each adjustment, until the capacity is decreased to 1/N of the maximum capacity of the LLC resource; and monitor a variation that is generated when the preset performance indicator of each program varies with the capacity of the allocated LLC resource in an adjustment process, and use the variation as the performance data of each program, where the preset performance indicator is a speed-up ratio of each program.

With reference to the second aspect or the first possible implementation manner of the second aspect, in a second possible implementation manner, the front end unit further includes a categorizing unit, where the categorizing unit is specifically configured to:

count a quantity of times that each program accesses a main memory in a preset stage of a running process, to obtain the memory access frequency of each program;

compare the performance data of each program and the memory access frequency, obtained by means of statistics collection, of each program with the preset threshold, where the preset threshold includes a first threshold, a second threshold, and a third threshold, the first threshold and the second threshold are performance data thresholds, and the third threshold is a memory access frequency threshold; and if performance data of a program is greater than the first threshold, categorize the program as a high demand type;

if performance data of a program is less than the first threshold and greater than the second threshold, categorize the program as a medium demand type; or if performance data of a program is less than the second threshold and a memory access frequency is greater than the third threshold, categorize the program as a low demand and intensive type.

With reference to the second aspect, in a third possible implementation manner, the preset decision policy is a partitioning policy decision tree in the operating system kernel, and the partitioning policy decision tree is implemented in the operating system kernel in algorithm form, and the decision-making unit is specifically configured to:

update the categorization of each program in the working set to the operating system kernel, and search the partitioning policy decision tree in the operating system kernel for a corresponding node in light of a category of each program in the working set, to determine the page coloring-based partitioning policy corresponding to the working set.

With reference to the third possible implementation manner of the second aspect, in a fourth possible implementation manner, the page coloring-based partitioning policy includes the page coloring-based collaborative partitioning policy and a page coloring-based non-collaborative partitioning policy;

the page coloring-based collaborative partitioning policy is a partitioning policy of using overlapped index address bits O-bits as page coloring-based partitioning index bits, and the O-bits are overlapped address bits of index bits of the LLC and index bits of the DRAM Bank in a physical page frame, and are used to index page coloring-based partitioning for both the LLC and the DRAM Bank; and the page coloring-based collaborative partitioning policy includes:

a category A multi-level memory collaborative partitioning policy A-MMCP, in which the O-bits are used as partitioning index bits, and the LLC and the DRAM Bank are partitioned into a same quantity of equal portions;

a category B multi-level memory collaborative partitioning policy B-MMCP, in which the O-bits and an index bit of the DRAM Bank are used as partitioning index bits, the LLC and the DRAM Bank are partitioned into different quantities of equal portions, and a quantity of partitioned equal portions of the DRAM Bank is greater than a quantity of partitioned equal portions of the LLC; and a category C multi-level memory collaborative partitioning policy C-MMCP, in which the O-bits and an index bit of the LLC are used as partitioning index bits, the LLC and the DRAM Bank are partitioned into different quantities of equal portions, and a quantity of partitioned equal portions of the DRAM Bank is less than a quantity of partitioned equal portions of the LLC; and the page coloring-based non-collaborative partitioning policy is a partitioning policy in which the O-bits are not used and includes:

a Cache-Only policy, in which coloring-based partitioning is performed on the LLC by using the index bit of the LLC, and coloring-based partitioning is not performed on the DRAM Bank; and a Bank-Only policy, in which coloring-based partitioning is performed on the DRAM Bank by using the index bit of the DRAM Bank, and coloring-based partitioning is not performed on the LLC.

With reference to the third possible implementation manner of the second aspect or the fourth possible implementation manner of the second aspect, in a fifth possible implementation manner, the decision-making unit is further specifically configured to:

if each category to which each program in the working set belongs is the high demand type, select the Bank-Only policy;

if there is the low demand and intensive type in a category to which each program in the working set belongs, further determine a quantity of programs in the working set; and if the quantity of programs is less than or equal to N, select the A-MMCP; otherwise, select the C-MMCP, where N is a quantity of cores of a processor; or if there is the medium demand type and there is no low demand and intensive type in a category to which each program in the working set belongs, further determine a quantity of programs in the working set; and if the quantity of programs is less than or equal to N, select the A-MMCP; otherwise, select the B-MMCP, where N is a quantity of cores of a processor.

According to the memory resource optimization method and apparatus provided in the embodiments of the present invention, an LLC resource is partitioned by using a page coloring technology, performance data of each program in a working set is acquired, a category of each program is obtained in light of a memory access frequency, a page coloring-based partitioning policy corresponding to the working set is selected according to the category of each program, and the page coloring-based partitioning policy is written to an operating system kernel, to complete corresponding page coloring-based partitioning processing. In this way, a collaborative partitioning policy between the LLC and a DRAM Bank is implemented in light of a feature of the working set, and mutual interference of processes or threads on a memory resource can be reduced and even eliminated, thereby improving overall performance of a computer.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
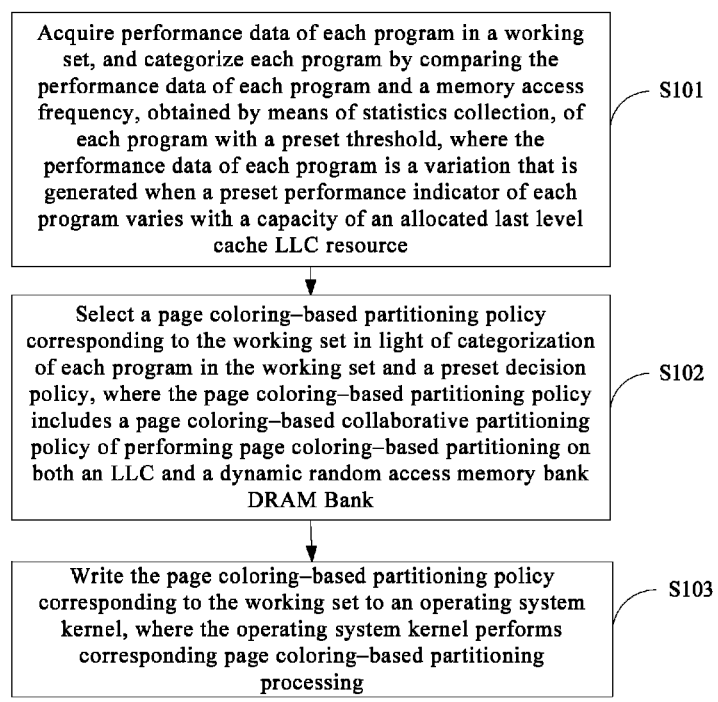
FIG. 1 is a schematic flowchart of a memory resource optimization method according to an embodiment of the present invention.

An embodiment of the present invention provides a memory resource optimization method. As shown in FIG. 1, the method includes:

S101: Acquire performance data of each program in a working set, and categorize each program by comparing the performance data of each program and a memory access frequency, obtained by means of statistics collection, of each program with a preset threshold, where the performance data of each program is a variation that is generated when a preset performance indicator of each program varies with a capacity of an allocated last level cache LLC resource.

S102: Select, in light of categorization of each program in the working set and a preset decision policy, a page coloring-based partitioning policy corresponding to the working set, where the page coloring-based partitioning policy includes a page coloring-based collaborative partitioning policy for performing page coloring-based partitioning on both an LLC and a dynamic random access memory bank DRAM Bank.

S103: Write the page coloring-based partitioning policy corresponding to the working set to an operating system kernel, where the operating system kernel performs corresponding page coloring-based partitioning processing.

According to the memory resource optimization method provided in this embodiment of the present invention, performance data of each program in a working set is acquired, a category of each program is obtained in light of a memory access frequency, a page coloring-based partitioning policy of the working set is selected according to the category of each program, and the page coloring-based partitioning policy is written to an operating system kernel, to complete corresponding page coloring-based partitioning processing. In this way, a collaborative partitioning policy between an LLC and a DRAM Bank is implemented in light of a feature of the working set, and mutual interference of processes or threads on a memory resource can be reduced and even eliminated, thereby improving overall performance of a computer.

Figure 2:
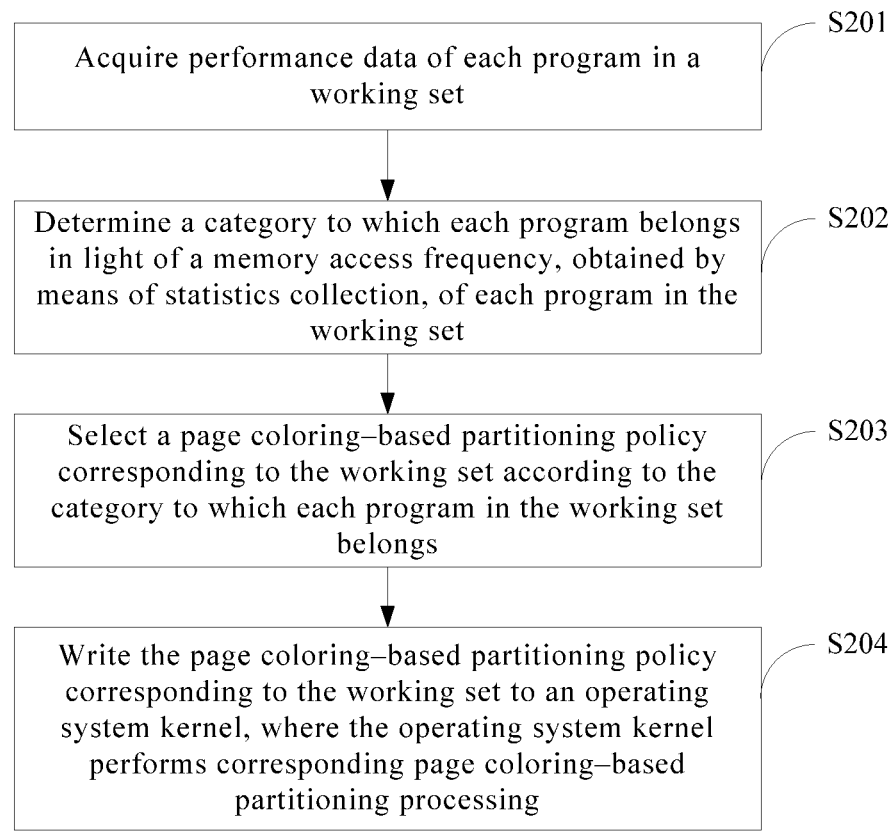
FIG. 2 is a schematic flowchart of another memory resource optimization method according to an embodiment of the present invention.

In order to enable a person skilled in the art to understand the technical solutions provided by the embodiments of the present invention more clearly, the following describes another memory resource optimization method provided by an embodiment of the present invention in detail by using a specific example. As shown in FIG. 2, the method includes:

S201: Acquire performance data of each program in a working set.

Specifically, an LLC resource is partitioned by using a page coloring technology, the LLC resource is partitioned into N portions, and 1/N of a maximum capacity of the LLC resource is taken as one level. The maximum capacity of the LLC resource is allocated to each program at the beginning, and the capacity of the LLC resource allocated to each program is decreased by one level in each adjustment, until the capacity of the LLC resource allocated to each program is decreased to 1/N of the maximum capacity of the LLC resource; a variation that is generated when a preset performance indicator of each program varies with the capacity of the allocated LLC resource in an adjustment process is monitored, and the variation is used as the performance data of each program.

Exemplarily, in a quad-core processor, N may be 8, ⅛ of a maximum capacity of an LLC resource is taken as one level, a capacity of the LLC resource allocated to each program in a working set is adjusted, and the capacity of the LLC resource allocated to each program in the working set is decreased by one level in each adjustment, until the capacity of the LLC resource allocated to each program is decreased to ⅛ of the maximum capacity of the LLC resource; a variation that is generated when a preset performance indicator of each program varies with the capacity of the allocated LLC resource in the foregoing adjustment process is monitored.

The preset performance indicator of each program may be a normalization speed-up ratio, the variation that is generated when the normalization speed-up ratio of each program varies with the capacity of the allocated LLC resource in the entire adjustment process is acquired, and the variation is used as the performance data of each program.

S202: Determine a category to which each program belongs in light of a memory access frequency, obtained by means of statistics collection, of each program in the working set.

Specifically, a hardware performance counter is used to count a quantity of times that each program accesses a main memory in a preset stage or time period of a running process, to obtain the memory access frequency of each program.

Then, the category to which each program belongs is determined in light of the performance data of each program and the memory access frequency of each program and according to a preset threshold.

The preset threshold includes a first threshold, a second threshold, and a third threshold, where the first threshold and the second threshold are performance data thresholds, and the third threshold is a memory access frequency threshold.

Figure 3:
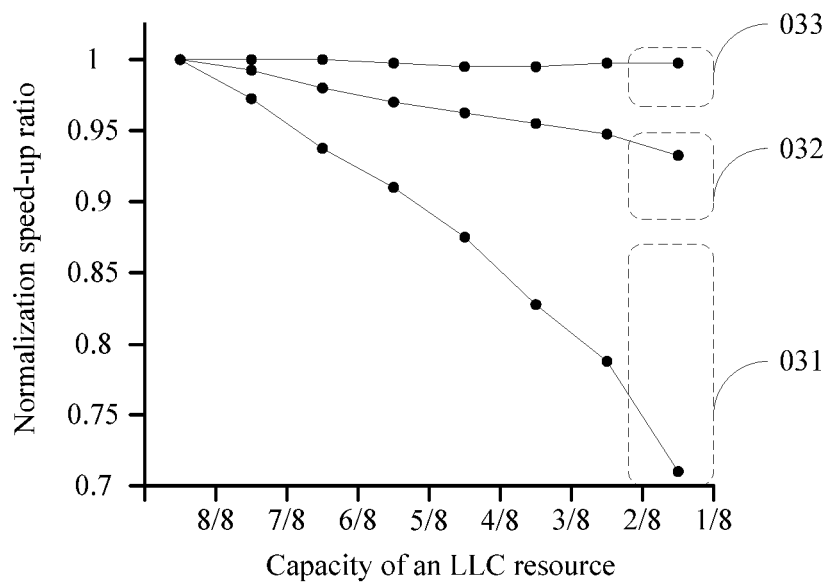
FIG. 3 is a schematic diagram of a program categorization effect according to an embodiment of the present invention.

Exemplarily, the performance data is a variation that is generated when the normalization speed-up ratio of each program varies with the capacity of the LLC resource allocated to each program. In a process in which the capacity of the LLC allocated to each program is adjusted and decreased from the maximum capacity of the LLC to 1/N of the maximum capacity of the LLC, taking a quad-core computer as an example, where N is 8, as shown in FIG. 3, a curve in which the normalization speed-up ratio of each program varies with the capacity of the LLC resource allocated to each program is obtained. Therefore, it may be learned that a main categorization manner is as follows:

if a normalization speed-up ratio of a program is greater than the first threshold, it can be known that deterioration in performance of such a program is very considerable when the capacity of the LLC resource decreases, that is, the performance of such a program is greatly affected by the capacity of the allocated LLC resource, and such a program is categorized as a high demand type 031;

if a normalization speed-up ratio of a program is less than the first threshold and greater than the second threshold, it can be known that deterioration in performance of such a program is moderate when the capacity of the LLC resource decreases, that is, the performance of such a program is moderately affected by the capacity of the allocated LLC resource, and such a program is categorized as a medium demand type 032; or if a normalization speed-up ratio of a program is less than the second threshold and a memory access frequency is greater than the third threshold, it can be known that a variation range of performance of such a program is very small when the capacity of the LLC resource decreases, and that the memory access frequency of the program is high, that is, the performance of such a program is relatively slightly affected by the capacity of the allocated LLC resource, and the program is of a low demand type 033; however, because the performance of such a program is greatly affected by a capacity of the main memory, the program is of a memory access intensive type; therefore, such a program is categorized as a low demand and intensive type.

Exemplarily, the foregoing high demand type 031 may further specifically include last level cache fitting (LLCF) and last level cache friendly (LLCFR); the foregoing medium demand type 032 may specifically include last level cache swing (LLCS); the foregoing low demand type 033 may specifically include: core cache fitting (CCF) and LLC thrashing (LLCT).

S203: Select a page coloring-based partitioning policy corresponding to the working set according to the category to which each program in the working set belongs.

Specifically, the category to which each program in the working set belongs is written to an operating system kernel, and then the page coloring-based partitioning policy corresponding to the working set is selected according to a preset decision policy.

The category to which each program in the working set belongs may be written to the operating system kernel by using a /proc mechanism. The preset decision policy may be a partitioning policy decision tree in the operating system kernel, and the partitioning policy decision tree is implemented in the operating system kernel in algorithm form.

Specifically, categorization of each program in the working set is written to the operating system kernel, the partitioning policy decision tree in the operating system kernel is searched for a corresponding node in light of the category of each program in the working set, so as to determine the page coloring-based partitioning policy corresponding to the working set. The page coloring-based partitioning policy includes a page coloring-based collaborative partitioning policy and a page coloring-based non-collaborative partitioning policy.

The page coloring-based collaborative partitioning policy is a partitioning policy of using overlapped index address bits O-bits as page coloring-based partitioning index bits, and the O-bits are overlapped address bits of index bits of the LLC and index bits of a DRAM Bank in a physical page frame, and are used to index page coloring-based partitioning for both the LLC and the DRAM Bank.

The page coloring-based collaborative partitioning policy includes:

a category A multi-level memory collaborative partitioning policy A-MMCP, in which the O-bits are used as partitioning index bits, and the LLC and the DRAM Bank are partitioned into a same quantity of equal portions;

a category B multi-level memory collaborative partitioning policy B-MMCP, in which the O-bits and an index bit of the DRAM Bank are used as partitioning index bits, the LLC and the DRAM Bank are partitioned into different quantities of equal portions, and a quantity of partitioned equal portions of the DRAM Bank is greater than a quantity of partitioned equal portions of the LLC; and a category C multi-level memory collaborative partitioning policy C-MMCP, in which the O-bits and an index bit of the LLC are used as partitioning index bits, the LLC and the DRAM Bank are partitioned into different quantities of equal portions, and a quantity of partitioned equal portions of the DRAM Bank is less than a quantity of partitioned equal portions of the LLC.

The page coloring-based non-collaborative partitioning policy is a partitioning policy in which the O-bits are not used and includes:

a Cache-Only policy, in which coloring-based partitioning is performed on the LLC by using the index bit of the LLC, and coloring-based partitioning is not performed on the DRAM Bank; and a Bank-Only policy, in which coloring-based partitioning is performed on the DRAM Bank by using the index bit of the DRAM Bank, and coloring-based partitioning is not performed on the LLC.

Exemplarily, the overlapped index address bits O-bits of the LLC and the DRAM Bank may be the $14^{th}$ and $15^{th}$ bits in the physical page frame, and four colors, that is, 00, 01, 10, and 11, may be obtained by means of partitioning by using the two index bits. Further, the $16^{th}$, $17^{th}$ and $18^{th}$ index bits of the LLC and the $21^{th}$ and $22^{th}$ index bits of the DRAM Bank also exist in the physical page frame.

In the A-MMCP, coloring-based partitioning is performed only by using the O-bits, that is, the $14^{th}$ and $15^{th}$ bits, the LLC may be partitioned into 4 equal portions, and the DRAM Bank may be partitioned into 4 equal portions.

In the B-MMCP, coloring-based partitioning is performed by using the O-bits and one of the index bits of the DRAM Bank, that is, the $14^{th}$, $15^{th}$, and $21^{st}$ bits, the LLC may be partitioned into 4 equal portions, and the DRAM Bank may be partitioned into 8 equal portions.

In the C-MMCP, coloring-based partitioning is performed by using the O-bits and one of the index bits of the LLC, that is, the 14th, 15th, and 16th bits, the LLC may be partitioned into 8 equal portions, and the DRAM Bank may be partitioned into 4 equal portions.

Specifically, that the partitioning policy decision tree is implemented in the operating system kernel in algorithm form includes:

if each category to which each program in the working set belongs is the high demand type 031, the Bank-Only policy is selected;

if there is the low demand and intensive type in a category to which each program in the working set belongs, a quantity of programs in the working set is further determined; and if the quantity of programs is less than or equal to N, the A-MMCP is selected; otherwise, the C-MMCP is selected, where N is a quantity of cores of a processor; or if there is the medium demand type 032 and there is no low demand and intensive type in a category to which each program in the working set belongs, a quantity of programs in the working set is further determined; and if the quantity of programs is less than or equal to N, the A-MMCP is selected; otherwise, the B-MMCP is selected, where N is a quantity of cores of a processor.

S204: Write the page coloring-based partitioning policy corresponding to the working set to an operating system kernel, where the operating system kernel performs corresponding page coloring-based partitioning processing.

Specifically, the selected page coloring-based partitioning policy may be written to the operating system kernel by using the /proc mechanism, and a buddy system (Buddy System) in an operating system adjusts a memory allocation mechanism, to complete a coloring-based partitioning operation.

Exemplarily, a management mechanism and a retrieval mechanism in the buddy system may complete management and retrieval on a page required for coloring; the buddy system may adjust the memory allocation mechanism, to enable the memory allocation mechanism to switch among various partitioning policies.

According to the memory resource optimization method provided in this embodiment of the present invention, an LLC resource is partitioned by using a page coloring technology, performance data of each program in a working set is acquired, a category of each program is obtained in light of a memory access frequency, a page coloring-based partitioning policy of the working set is selected according to the category of each program, and the page coloring-based partitioning policy is written to an operating system kernel, to complete corresponding page coloring-based partitioning processing. In this way, a collaborative partitioning policy between an LLC and a DRAM Bank is implemented in light of a feature of the working set, and mutual interference of processes or threads on a memory resource can be reduced and even eliminated, thereby improving overall performance of a computer.

Figure 4:
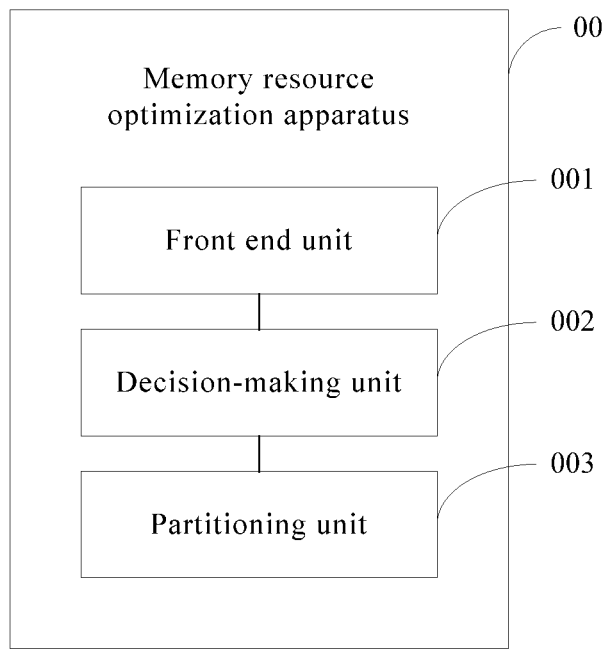
FIG. 4 is schematic structural diagram 1 of a memory resource optimization apparatus according to an embodiment of the present invention.

An embodiment of the present invention provides a memory resource optimization apparatus 00. As shown in FIG. 4, the apparatus includes:

a front end unit 001, configured to acquire performance data of each program in a working set, and categorize each program by comparing the performance data of each program and a memory access frequency, obtained by means of statistics collection, of each program with a preset threshold, where the performance data of each program is a variation that is generated when a preset performance indicator of each program varies with a capacity of an allocated last level cache LLC resource;

a decision-making unit 002, configured to select, in light of categorization of each program in the working set and a preset decision policy, a page coloring-based partitioning policy corresponding to the working set, where the page coloring-based partitioning policy includes a page coloring-based collaborative partitioning policy for performing page coloring-based partitioning on both an LLC and a dynamic random access memory bank DRAM Bank; and a partitioning unit 003, configured to write the page coloring-based partitioning policy corresponding to the working set to an operating system kernel, where the operating system kernel performs corresponding page coloring-based partitioning processing.

Figure 5:
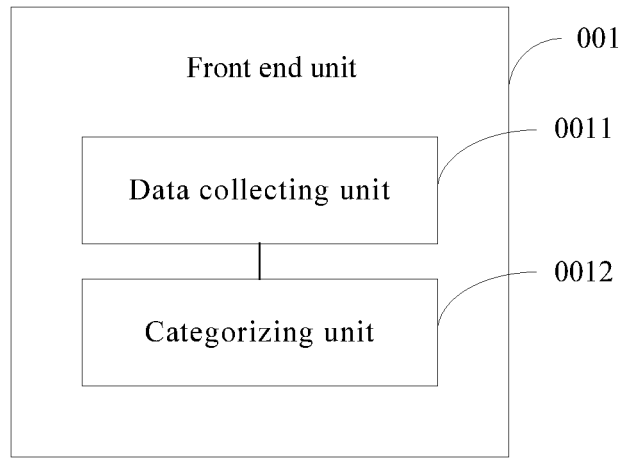
FIG. 5 is schematic structural diagram 2 of a memory resource optimization apparatus according to an embodiment of the present invention.

As shown in FIG. 5, the front end unit 001 may include a data collecting unit 0011 and a categorizing unit 0012.

Optionally, the data collecting unit 0011 is configured to partition the LLC resource into N portions by using a page coloring technology, take 1/N of a maximum capacity of the LLC resource as one level, allocate the maximum capacity of the LLC resource to each program at the beginning, and decrease the capacity of the LLC resource allocated to each program by one level in each adjustment, until the capacity is decreased to 1/N of the maximum capacity of the LLC resource; and monitor a variation that is generated when the preset performance indicator of each program varies with the capacity of the allocated LLC resource in an adjustment process, and use the variation as the performance data of each program, where the preset performance indicator is a speed-up ratio of each program.

Optionally, the categorizing unit 0012 is configured to count a quantity of times that each program accesses a main memory in a preset stage of a running process, to obtain the memory access frequency of each program;

compare the performance data of each program and the memory access frequency, obtained by means of statistics collection, of each program with the preset threshold, where the preset threshold includes a first threshold, a second threshold, and a third threshold, the first threshold and the second threshold are performance data thresholds, and the third threshold is a memory access frequency threshold; and if performance data of a program is greater than the first threshold, categorize the program as a high demand type;

if performance data of a program is less than the first threshold and greater than the second threshold, categorize the program as a medium demand type; or if performance data of a program is less than the second threshold and a memory access frequency is greater than the third threshold, categorize the program as a low demand and intensive type.

Optionally, the preset decision policy is a partitioning policy decision tree in the operating system kernel, and the partitioning policy decision tree is implemented in the operating system kernel in algorithm form; the decision-making unit 002 is specifically configured to:

write the categorization of each program in the working set to the operating system kernel, and search the partitioning policy decision tree in the operating system kernel for a corresponding node in light of a category of each program in the working set, to determine the page coloring-based partitioning policy corresponding to the working set.

Optionally, the page coloring-based partitioning policy includes the page coloring-based collaborative partitioning policy and a page coloring-based non-collaborative partitioning policy, where, specifically:

the page coloring-based collaborative partitioning policy is a partitioning policy of using overlapped index address bits O-bits as page coloring-based partitioning index bits, and the O-bits are overlapped address bits of index bits of the LLC and index bits of the DRAM Bank in a physical page frame, and are used to index page coloring-based partitioning for both the LLC and the DRAM Bank, where the page coloring-based collaborative partitioning policy includes:

a category A multi-level memory collaborative partitioning policy A-MMCP, in which the O-bits are used as partitioning index bits, and the LLC and the DRAM Bank are partitioned into a same quantity of equal portions;

a category B multi-level memory collaborative partitioning policy B-MMCP, in which the O-bits and an index bit of the DRAM Bank are used as partitioning index bits, the LLC and the DRAM Bank are partitioned into different quantities of equal portions, and a quantity of partitioned equal portions of the DRAM Bank is greater than a quantity of partitioned equal portions of the LLC; and a category C multi-level memory collaborative partitioning policy C-MMCP, in which the O-bits and an index bit of the LLC are used as partitioning index bits, the LLC and the DRAM Bank are partitioned into different quantities of equal portions, and a quantity of partitioned equal portions of the DRAM Bank is less than a quantity of partitioned equal portions of the LLC; and the page coloring-based non-collaborative partitioning policy is a partitioning policy in which the O-bits are not used and includes:

a Cache-Only policy, in which coloring-based partitioning is performed on the LLC by using the index bit of the LLC, and coloring-based partitioning is not performed on the DRAM Bank; and a Bank-Only policy, in which coloring-based partitioning is performed on the DRAM Bank by using the index bit of the DRAM Bank, and coloring-based partitioning is not performed on the LLC.

Optionally, the decision-making unit 002 is further specifically configured to:

if each category to which each program in the working set belongs is the high demand type, select the Bank-Only policy;

if there is the low demand and intensive type in a category to which each program in the working set belongs, further determine a quantity of programs in the working set; and if the quantity of programs is less than or equal to N, select the A-MMCP; otherwise, select the C-MMCP, where N is a quantity of cores of a processor; or if there is the medium demand type and there is no low demand and intensive type in a category to which each program in the working set belongs, further determine a quantity of programs in the working set; and if the quantity of programs is less than or equal to N, select the A-MMCP; otherwise, select the B-MMCP, where N is a quantity of cores of a processor.

According to the memory resource optimization apparatus provided in this embodiment of the present invention, an LLC resource is partitioned by using a page coloring technology, performance data of each program in a working set is acquired, a category of each program is obtained in light of a memory access frequency, a page coloring-based partitioning policy of the working set is selected according to the category of each program, and the page coloring-based partitioning policy is written to an operating system kernel, to complete corresponding page coloring-based partitioning processing. In this way, a collaborative partitioning policy between an LLC and a DRAM Bank is implemented in light of a feature of the working set, and mutual interference of processes or threads on a memory resource can be reduced and even eliminated, thereby improving overall performance of a computer.

Figure 6:
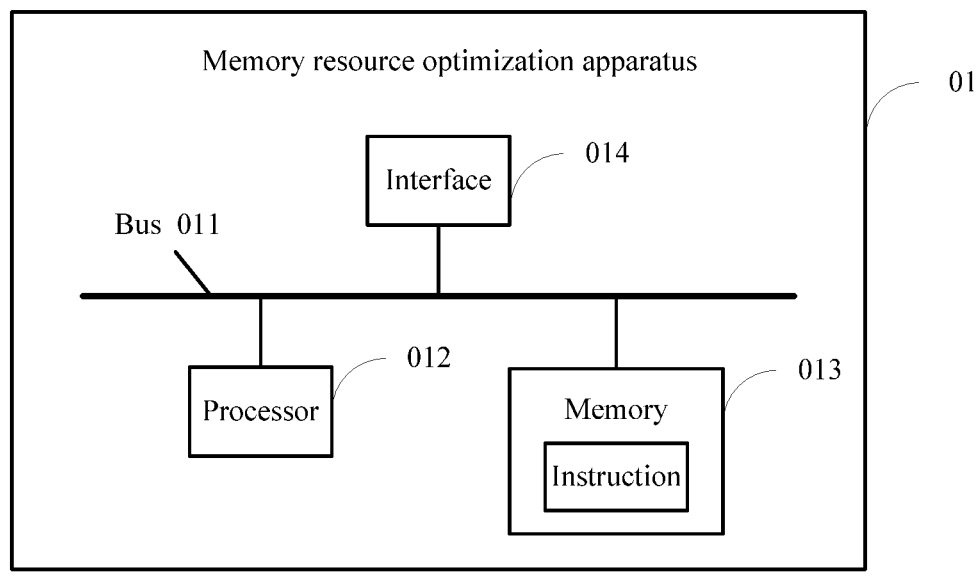
FIG. 6 is schematic structural diagram 3 of a memory resource optimization apparatus according to an embodiment of the present invention.

An embodiment of the present invention further provides a memory resource optimization apparatus 01. As shown in FIG. 6, the memory resource optimization apparatus 01 includes:

a bus 011, and a processor 012, a memory 013, and an interface 014 connected to the bus 011, where the interface 014 is configured to communicate with an external device.

The memory 013 is configured to store an instruction. The processor 012 is configured to execute the instruction, and is configured to acquire performance data of each program in a working set, and categorize each program by comparing the performance data of each program and a memory access frequency, obtained by means of statistics collection, of each program with a preset threshold, where the performance data of each program is a variation that is generated when a preset performance indicator of each program varies with a capacity of an allocated last level cache LLC resource.

The processor 012 executes the instruction, and is further configured to select, in light of categorization of each program in the working set and a preset decision policy, a page coloring-based partitioning policy corresponding to the working set, where the page coloring-based partitioning policy includes a page coloring-based collaborative partitioning policy for performing page coloring-based partitioning on both an LLC and a dynamic random access memory bank DRAM Bank.

The processor 012 executes the instruction, and is further configured to write the page coloring-based partitioning policy corresponding to the working set to an operating system kernel, where the operating system kernel performs corresponding page coloring-based partitioning processing.

In this embodiment of the present invention, optionally, the processor 012 executes the instruction, and may be specifically configured to: partition the LLC resource into N portions by using a page coloring technology, take 1/N of a maximum capacity of the LLC resource as one level, allocate the maximum capacity of the LLC resource to each program at the beginning, and decrease the capacity of the LLC resource allocated to each program by one level in each adjustment, until the capacity is decreased to 1/N of the maximum capacity of the LLC resource; and monitor a variation that is generated when the preset performance indicator of each program varies with the capacity of the allocated LLC resource in an adjustment process, and use the variation as the performance data of each program, where the preset performance indicator is a speed-up ratio of each program.

In this embodiment of the present invention, optionally, the processor 012 executes the instruction, and may be specifically configured to: count a quantity of times that each program accesses a main memory in a preset stage of a running process, to obtain the memory access frequency of each program;

compare the performance data of each program and the memory access frequency, obtained by means of statistics collection, of each program with the preset threshold, where the preset threshold includes a first threshold, a second threshold, and a third threshold, the first threshold and the second threshold are performance data thresholds, and the third threshold is a memory access frequency threshold; and if performance data of a program is greater than the first threshold, categorize the program as a high demand type;

if performance data of a program is less than the first threshold and greater than the second threshold, categorize the program as a medium demand type; or if performance data of a program is less than the second threshold and a memory access frequency is greater than the third threshold, categorize the program as a low demand and intensive type.

In this embodiment of the present invention, optionally, the preset decision policy is a partitioning policy decision tree in the operating system kernel, and the partitioning policy decision tree is implemented in the operating system kernel in algorithm form. The processor 012 executes the instruction, and may be specifically configured to:

write the categorization of each program in the working set to the operating system kernel, and search the partitioning policy decision tree in the operating system kernel for a corresponding node in light of a category of each program in the working set, to determine the page coloring-based partitioning policy corresponding to the working set.

In this embodiment of the present invention, optionally, the page coloring-based partitioning policy includes the page coloring-based collaborative partitioning policy and a page coloring-based non-collaborative partitioning policy, where, specifically:

the page coloring-based collaborative partitioning policy is a partitioning policy of using overlapped index address bits O-bits as page coloring-based partitioning index bits, and the O-bits are overlapped address bits of index bits of the LLC and index bits of the DRAM Bank in a physical page frame, and are used to index page coloring-based partitioning for both the LLC and the DRAM Bank, where the page coloring-based collaborative partitioning policy includes:

a category A multi-level memory collaborative partitioning policy A-MMCP, in which the O-bits are used as partitioning index bits, and the LLC and the DRAM Bank are partitioned into a same quantity of equal portions;

a category B multi-level memory collaborative partitioning policy B-MMCP, in which the O-bits and an index bit of the DRAM Bank are used as partitioning index bits, the LLC and the DRAM Bank are partitioned into different quantities of equal portions, and a quantity of partitioned equal portions of the DRAM Bank is greater than a quantity of partitioned equal portions of the LLC; and a category C multi-level memory collaborative partitioning policy C-MMCP, in which the O-bits and an index bit of the LLC are used as partitioning index bits, the LLC and the DRAM Bank are partitioned into different quantities of equal portions, and a quantity of partitioned equal portions of the DRAM Bank is less than a quantity of partitioned equal portions of the LLC; and the page coloring-based non-collaborative partitioning policy is a partitioning policy in which the O-bits are not used and includes:

a Cache-Only policy, in which coloring-based partitioning is performed on the LLC by using the index bit of the LLC, and coloring-based partitioning is not performed on the DRAM Bank; and a Bank-Only policy, in which coloring-based partitioning is performed on the DRAM Bank by using the index bit of the DRAM Bank, and coloring-based partitioning is not performed on the LLC.

In this embodiment of the present invention, optionally, the processor 012 executes the instruction, and may be specifically configured to:

if each category to which each program in the working set belongs is the high demand type, select the Bank-Only policy;

if there is the low demand and intensive type in a category to which each program in the working set belongs, further determine a quantity of programs in the working set; and if the quantity of programs is less than or equal to N, select the A-MMCP; otherwise, select the C-MMCP, where N is a quantity of cores of a processor; or if there is the medium demand type and there is no low demand and intensive type in a category to which each program in the working set belongs, further determine a quantity of programs in the working set; and if the quantity of programs is less than or equal to N, select the A-MMCP; otherwise, select the B-MMCP, where N is a quantity of cores of a processor.

According to the memory resource optimization apparatus provided in this embodiment of the present invention, an LLC resource is partitioned by using a page coloring technology, performance data of each program in a working set is acquired, a category of each program is obtained in light of a memory access frequency, a page coloring-based partitioning policy of the working set is selected according to the category of each program, and the page coloring-based partitioning policy is written to an operating system kernel, to complete corresponding page coloring-based partitioning processing. In this way, a collaborative partitioning policy between an LLC and a DRAM Bank is implemented in light of a feature of the working set, and mutual interference of processes or threads on a memory resource can be reduced and even eliminated, thereby improving overall performance of a computer.

In the several embodiments provided in the present application, it should be understood that the disclosed apparatus and method may be implemented in other manners. For example, the described apparatus embodiments are merely exemplary. For example, the module division is merely logical function division, and there may be other division manners in actual implementation. In addition, the displayed or discussed connections between modules may be implemented by using some interfaces, and may be implemented in electronic, mechanical, or other forms.

The modules may or may not be physically separate, and may or may not be physical units. Some or all of the modules may be selected according to actual requirements to achieve the objectives of the solutions of the embodiments.

In addition, functional modules in the embodiments of the present invention may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional unit, the integrated unit may be stored in a computer-readable storage medium. The software functional module is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A computer system, comprising
an allocated last level cache (LLC);
a dynamic random access memory bank (DRAM Bank); and
a processor coupled to the LLC and the DRAM Bank, the processor to execute a first working set of programs via the LLC and the DRAM Bank, wherein the processor is configured to:
partition processing resources, according to a page coloring-based collaborative partitioning policy for the first working set, the processing resources including both the LLC and the DRAM bank, wherein the page coloring-based collaborative partitioning policy is based on overlapped address bits (O-bits) of index bits of the LLC and index bits of the DRAM Bank in a physical page frame, the O-bits to index page coloring-based partitioning for capacity of the LLC and capacity of the DRAM Bank.

2. The computer system according to the claim 1, wherein the processor is further configured to:
acquire performance data of each program in the first working set of programs, wherein the performance data of each program includes variations indicated by a performance indicator of the program with respect to an allocated capacity of the LLC for the program;
obtain a memory access frequency of each program in the first working set; and
categorize each program in the first working set according to the performance data and the memory access frequency, wherein each program in the first working set is categorized as one of a plurality of types.

3. The computer system according to the claim 2, wherein a particular one of the programs is categorized as a high demand type when performance data of the particular one program has a value greater than a first performance data threshold,
wherein the particular one program is categorized as a medium demand type when the performance data of the particular one program has a value less than the first performance data threshold and greater than a second performance data threshold, wherein the first performance data threshold is greater than the second performance data threshold, and
wherein the particular one program is categorized as a low demand and intensive type when the performance data of the particular one program has a value less than the second performance data threshold and a memory access frequency of the particular one program has a value greater than a preset memory access frequency threshold.

4. The computer system according to the claim 3, wherein the page coloring-based collaborative partitioning policy comprises a category A multi-level memory collaborative partitioning policy (A-MMCP) based on the O-bits as partitioning index bits, the capacity of the LLC and the capacity of the DRAM Bank to be partitioned into a same quantity of equally partitioned portions of the LLC and equally partitioned portions of the DRAM Bank via the A-MMCP; and
wherein the processing resources are partitioned according to the A-MMCP when at least one of the programs in the first working set is categorized as the low demand and intensive type and when a quantity of the programs in the first working set is less than or equal to N, wherein N represents a quantity of cores of a processor.

5. The computer system according to the claim 3, wherein the page coloring-based collaborative partitioning policy comprises a category B multi-level memory collaborative partitioning policy (B-MMCP) based on the O-bits and an index bit of the DRAM Bank as partitioning index bits, the capacity of the LLC and the capacity of the DRAM Bank to be partitioned into different quantities of equal portions via B-MMCP, and a quantity of equally partitioned portions of the capacity of the DRAM Bank being greater than a quantity of equally partitioned portions of the capacity of the LLC via the B-MMCP; and
wherein the processing resources are partitioned according to the B-MMCP when at least one of the programs in the first working set is categorized as the medium demand type and none of the programs is categorized as the low demand and intensive type and when a quantity of programs in the first working set is greater than N, wherein N is a quantity of cores of a processor.

6. The computer system according to the claim 3, wherein the page coloring-based collaborative partitioning policy comprises a category C multi-level memory collaborative partitioning policy (C-MMCP) based on the O-bits and an index bit of the LLC as partitioning index bits, the capacity of the LLC and the capacity of the DRAM Bank to be partitioned into different quantities of equal portions via the C-MMCP, and a quantity of equally partitioned portions of the capacity of the DRAM Bank via the C-MMCP being less than a quantity of equally partitioned portions of the capacity of the LLC via the C-MMCP; and
wherein the processing resources are partitioned according to the C-MMCP when at least one of the programs in the first working set is categorized as the low demand and intensive type and when a quantity of the programs in the first working set is greater than N, wherein N represents a quantity of cores of a processor.

7. The computer system according to the claim 3, wherein the page coloring-based collaborative partitioning policy comprises a category A multi-level memory collaborative partitioning policy (A-MMCP) based on the O-bits as partitioning index bits, the capacity of the LLC and the capacity of the DRAM Bank to be partitioned into a same quantity of equally partitioned portions of the LLC and equally partitioned portions of the DRAM Bank via the A-MMCP; and
wherein the processing resources are partitioned according to the A-MMCP when at least one of the programs in the first working set is categorized as a medium demand type and none of the programs is categorized as the low demand and intensive type and when a quantity of programs in the first working set is less than or equal to N, wherein N is a quantity of cores of a processor.

8. The computer system according to the claim 1, the processor to execute a second working set of programs, wherein the processor is further configured to:
partition the processing resources, according to a page coloring-based non-collaborative partitioning policy independent of the O-bits, for the second working set, wherein the page coloring-based non-collaborative partitioning policy comprises a Cache-Only policy and a Bank-Only policy, the Cache-Only policy for page coloring-based partitioning on the capacity of the LLC based on the index bit of the LLC, the Bank-Only policy for page coloring-based partitioning on the capacity of the DRAM Bank based on the index bit of the DRAM Bank.

9. The computer system according to the claim 2, wherein the acquiring performance data of each program comprises:
partitioning the LLC resource into N portions;
allocating an initial capacity of the LLC to each program, the initial capacity including the N portions of the LLC;
decreasing the capacity of the LLC allocated to each program in a sequence of adjustments, until the capacity is decreased to one of the N portions of the LLC, wherein each adjustment reduces the capacity allocated by one of the N portions of the LLC; and
monitoring a variation that is generated by the performance indicator of each program, the performance indicator varying with the sequence of adjustments of the capacity of the allocated LLC, wherein the performance indicator includes a speed-up ratio of each program and wherein the performance data is based on the variation monitored.

10. A memory resource optimization method, wherein processing resources including an allocated last level cache (LLC) resource and a memory having a dynamic random access memory bank (DRAM Bank) are used for a first working set of programs, the method comprising:
partitioning, according to a page coloring-based collaborative partitioning policy for the first working set, the processing resources including both the LLC and the DRAM bank, wherein the page coloring-based collaborative partitioning policy is based on overlapped address bits (O-bits) of index bits of the LLC and index bits of the DRAM Bank in a physical page frame, the O-bits to index page coloring-based partitioning for capacity of the LLC and capacity of the DRAM Bank.

11. The method according to claim 10, further comprising:
acquiring performance data of each program in the first working set of programs, wherein the performance data of each program includes variations indicated by a performance indicator of the program with respect to an allocated capacity of the LLC for the program;
obtaining a memory access frequency of each program in the first working set; and
categorizing each program in the first working set according to the performance data and the memory access frequency, wherein each program in the first working set is categorized as one of a plurality of types.

12. The method according to claim 11, wherein a particular one of the programs is categorized as a high demand type when performance data of the particular one program has a value greater than a first performance data threshold,
wherein the particular one program is categorized as a medium demand type when the performance data of the particular one program has a value less than the first performance data threshold and greater than a second performance data threshold, wherein the first performance data threshold is greater than the second performance data threshold, and
wherein the particular one program is categorized as a low demand and intensive type when the performance data of the particular one program has a value less than the second performance data threshold and a memory access frequency of the particular one program has a value greater than a preset memory access frequency threshold.

13. The method according to claim 12, wherein the page coloring-based collaborative partitioning policy comprises a category A multi-level memory collaborative partitioning policy (A-MMCP) based on the O-bits as partitioning index bits, the capacity of the LLC and the capacity of the DRAM Bank to be partitioned into a same quantity of equally partitioned portions of the LLC and equally partitioned portions of the DRAM Bank via the A-MMCP; and
wherein the processing resources are partitioned according to the A-MMCP when at least one of the programs in the first working set is categorized as the low demand and intensive type and when a quantity of the programs in the first working set is less than or equal to N, wherein N represents a quantity of cores of a processor.

14. The method according to claim 12, wherein the page coloring-based collaborative partitioning policy comprises a category B multi-level memory collaborative partitioning policy (B-MMCP) based on the O-bits and an index bit of the DRAM Bank as partitioning index bits, the capacity of the LLC and the capacity of the DRAM Bank to be partitioned into different quantities of equal portions via B-MMCP, and a quantity of equally partitioned portions of the capacity of the DRAM Bank being greater than a quantity of equally partitioned portions of the capacity of the LLC via the B-MMCP; and
wherein the processing resources are partitioned according to the B-MMCP when at least one of the programs in the first working set is categorized as the medium demand type and none of the programs is categorized as the low demand and intensive type and when a quantity of programs in the first working set is greater than N, wherein N is a quantity of cores of a processor.

15. The method according to claim 12, wherein the page coloring-based collaborative partitioning policy comprises a category C multi-level memory collaborative partitioning policy (C-MMCP) based on the O-bits and an index bit of the LLC as partitioning index bits, the capacity of the LLC and the capacity of the DRAM Bank to be partitioned into different quantities of equal portions via the C-MMCP, and a quantity of equally partitioned portions of the capacity of the DRAM Bank via the C-MMCP being less than a quantity of equally partitioned portions of the capacity of the LLC via the C-MMCP; and
wherein the processing resources are partitioned according to the C-MMCP when at least one of the programs in the first working set is categorized as the low demand and intensive type and when a quantity of the programs in the first working set is greater than N, wherein N represents a quantity of cores of a processor.

16. The method according to claim 12, wherein the page coloring-based collaborative partitioning policy comprises a category A multi-level memory collaborative partitioning policy (A-MMCP) based on the O-bits as partitioning index bits, the capacity of the LLC and the capacity of the DRAM Bank to be partitioned into a same quantity of equally partitioned portions of the LLC and equally partitioned portions of the DRAM Bank via the A-MMCP; and
wherein the processing resources are partitioned according to the A-MMCP when at least one of the programs in the first working set is categorized as a medium demand type and none of the programs is categorized as the low demand and intensive type and when a quantity of programs in the first working set is less than or equal to N, wherein N is a quantity of cores of a processor.

17. The method according to the claim 10, wherein the processing resources are further used for a second working set of programs, and wherein the method further comprises:
partitioning the processing resources, according to a page coloring-based non-collaborative partitioning policy independent of the O-bits, for the second working set, wherein the page coloring-based non-collaborative partitioning policy comprises a Cache-Only policy and a Bank-Only policy, the Cache-Only policy for page coloring-based partitioning on the capacity of the LLC based on the index bit of the LLC, the Bank-Only policy for page coloring-based partitioning on the capacity of the DRAM Bank based on the index bit of the DRAM Bank.

18. The method according to the claim 11, wherein the acquiring performance data of each program comprises:
partitioning the LLC resource into N portions;
allocating an initial capacity of the LLC to each program, the initial capacity including the N portions of the LLC;
decreasing the capacity of the LLC allocated to each program in a sequence of adjustments, until the capacity is decreased to one of the N portions of the LLC, wherein each adjustment reduces the capacity allocated by one of the N portions of the LLC; and
monitoring a variation that is generated by the performance indicator of each program, the performance indicator varying with the sequence of adjustments of the capacity of the allocated LLC, wherein the performance indicator includes a speed-up ratio of each program and wherein the performance data is based on the variation monitored.

19. A non-transitory computer program product comprising one or more computer-executable instructions, wherein processing resources are used for a first working set of programs, the processing resources including an allocated last level cache (LLC) resource and a memory having a dynamic random access memory bank (DRAM Bank), and wherein the one or more computer-executable instructions, when executed on at least one processor of a computer system, cause the computer system to carry out:
partitioning, according to a page coloring-based collaborative partitioning policy for the first working set, the processing resources including both the LLC and the DRAM bank, wherein the page coloring-based collaborative partitioning policy is based on overlapped address bits (O-bits) of index bits of the LLC and index bits of the DRAM Bank in a physical page frame, the O-bits to index page coloring-based partitioning for capacity of the LLC and capacity of the DRAM Bank.

20. The non-transitory computer program product according to the claim 19, wherein the one or more computer-executable instructions, when executed on the at least one processor of the computer system, cause the computer system to further carry out:
acquiring performance data of each program in the first working set of programs, wherein the performance data of each program includes variations indicated by a performance indicator of the program with respect to an allocated capacity of the LLC for the program;
obtaining a memory access frequency of each program in the first working set; and
categorizing each program in the first working set according to the performance data and the memory access frequency, wherein each program in the first working set is categorized as one of a plurality of types.

21. The non-transitory computer program product according to the claim 19, wherein a particular one of the programs is categorized as a high demand type when performance data of the particular one program has a value greater than a first performance data threshold,
wherein the particular one program is categorized as a medium demand type when the performance data of the particular one program has a value less than the first performance data threshold and greater than a second performance data threshold, wherein the first performance data threshold is greater than the second performance data threshold, and
wherein the particular one program is categorized as a low demand and intensive type when the performance data of the particular one program has a value less than the second performance data threshold and a memory access frequency of the particular one program has a value greater than a preset memory access frequency threshold.

* * * * *